J. W. LAIRD.
DUST CAP FOR PNEUMATIC TIRE VALVES.
APPLICATION FILED JAN. 5, 1920.
1,349,463.
Patented Aug. 10, 1920.
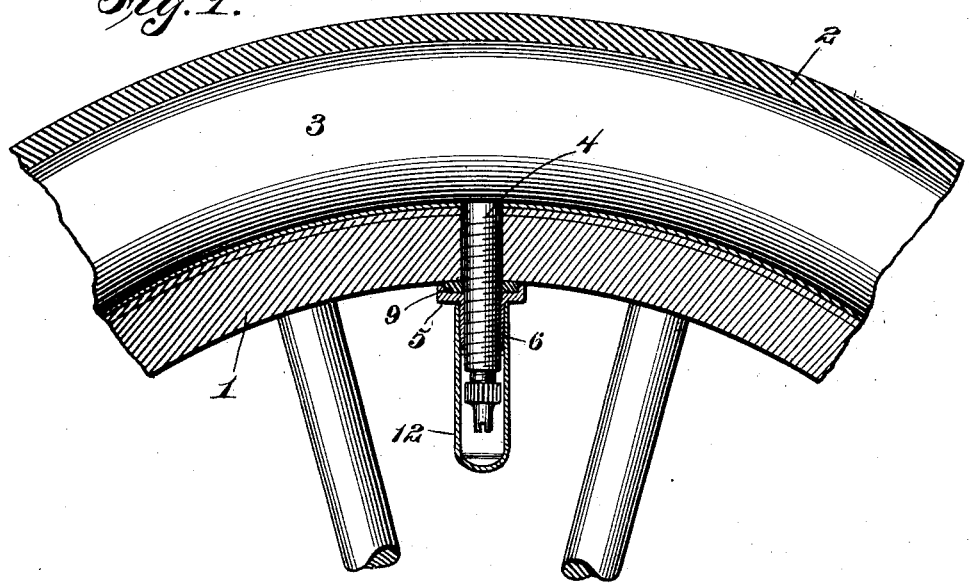
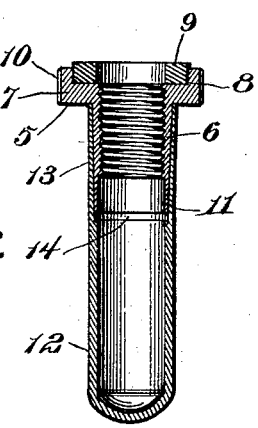
Inventor
J. W. Laird
Atty

UNITED STATES PATENT OFFICE.

JOHN WILLIAM LAIRD, OF PASADENA, CALIFORNIA.

DUST-CAP FOR PNEUMATIC-TIRE VALVES.

1,349,463.     Specification of Letters Patent.     Patented Aug. 10, 1920.

Application filed January 5, 1920. Serial No. 349,546.

*To all whom it may concern:*

Be it known that I, JOHN WILLIAM LAIRD, a citizen of the United States, residing at Pasadena, in the county of Los Angeles and State of California, have invented new and useful Improvements in Dust-Caps for Pneumatic-Tire Valves, of which the following is a specification.

This invention relates to dust caps for pneumatic tire valves such as are used on automobiles.

An object of the invention is to provide a dust cap of simple construction having a smooth continuous exterior surface, free from usual grooves or ridges wherein dust and grease naturally collects, and one which is readily and quickly applied or removed, without the manipulation of usual or positive securing means.

Another object of the invention is to provide a supporting means for the dust cap, coöperating with the same whereby it is retained securely in operative position, and of a nature to render the tire valve absolutely free from possibility of ingress of water, grease or dust to the same.

In the accompanying drawings:—

Figure 1 is a fragmentary sectional view of an automobile wheel and the tire valve showing the invention applied to the latter, and Fig. 2 is an enlarged longitudinal section of the invention *per se.*

In Fig. 1, there is shown a part of a rim or felly 1 having a tire casing 2 inclosing an inner tube 3, positioned therein. Connecting the inner tube 3 and extending through the felly 1 is the usual air valve shell 4 which is exteriorly threaded to receive a rim or jam nut 5, the latter forming a specific part of the present invention and acting to secure the valve shell rigidly in position in the opening of the felly.

In both of the figures of the drawing, the rim or jam nut 5 is shown to comprise an elongated tubular extension 6 interiorly threaded throughout the lower and greater portion of its length for engagement with the threaded surface of the air valve shell 4, and a relatively heavy base portion 7, the latter being of greater diameter than the tubular extension, and having its under face formed to provide an annular seat 8 for the reception of a washer 9 of leather or other suitable material. The contact of the washer 9 with the opposed surface of the felly 1 when the rim nut is positioned on the valve shell 4, provides, for absolute protection against the ingress of water, grease, or dust to the felly opening. The rim or jam nut 5 may have its periphery milled as at 10, or be finished in any other suitable manner to facilitate its removal from its engaged position on the air valve shell. The inner wall of the tubular extension 6 is tapered as at 11, outwardly from the terminal point of the threaded portion of the same, so as to lend resiliency to the free end of the extension for the purpose to be hereinafter more fully described.

The dust cap, proper, comprises an elongated tubular body 12 of even exterior diameter throughout its length, closed at one end and open at its other end for engagement with the tubular extension 6 of the rim or jam nut 5, when supported on the latter. The interior wall of the dust cap body 12 is tapered, as at 13, inwardly from the open end to a point removed from the same and corresponding in distance therefrom to the length of the said tubular extension 6, thus forming an elastic portion adapted for frictional engagement with the latter, which frictional engagement is added to by reason of the elasticity of the outer end of the tubular extension 6, as herein before mentioned. The inner end of the tapered portion 11 terminates in spaced relation with respect to the shoulder 14, formed in the inner wall of the dust cap body, which allows for a certain unrestricted elasticity at this point of the tapered end 13, without reducing the desired strength or durability of the dust cap body when the latter is in position.

In the application of the dust cap and rim nut support, the latter is threaded onto the air valve shell 4 until the washer 9 is placed under compression sufficient to prevent ingress of water, grease or dust thereunder; and is, as usual, left permanently in position, or until it is desired to replace the tire on the wheel, to otherwise repair or replace parts of the air valve, after which the dust cap is slipped onto the tubular extension 6, of the rim or jam nut 5, with sufficient force to contact the end wall of the open end of the same with the opposed wall of the base portion 7 of the latter, where it is held securely in position by reason of the frictional engagement of the inner tapered surface of the dust cap with the outer surface of the tubular extension. The removal of the dust cap, consequently, involves nothing more than the exerting of sufficient force to overcome the frictional engagement, aforesaid.

Having thus fully described my invention, what I claim is:—

1. In a dust cap for pneumatic tire valves, the combination with a valve body, of a flanged rim nut for securing the valve body in position, a tubular extension formed on said rim nut and having an inner rigid threaded portion engaging the projecting end portion of said valve body and an outer unthreaded elastic portion surrounding the valve body and spaced therefrom, and a dust cap having an unbroken elastic end portion engaging said tubular extension and abutting the outer face of the flange of said rim nut.

2. In a dust cap for pneumatic tire valves, the combination with a valve body, of a flanged rim nut for securing the valve body in position, a tubular extension formed with said rim nut and having an inner rigid threaded portion engaging the projecting end portion of said valve body and an outer unthreaded elastic portion, the wall of said outer portion being of reduced thickness and spaced from the valve body so as to lend elasticity thereto, and a dust cap having an unbroken elastic end portion engaging said tubular extension and abutting the outer face of the flange of said rim nut.

3. In a dust cap for pneumatic tire valves, the combination with a valve body, of a rim nut for securing the valve body in position, a tubular extension formed with said rim nut and having an inner rigid threaded portion engaging the projecting end portion of said valve body and an outer unthreaded unbroken elastic portion surrounding the valve body, the wall of said outer portion being interiorly tapered to lend elasticity thereto and in spaced relation to the valve body, and a dust cap having the wall of its open end portion unbroken and interiorly tapered to lend elasticity thereto, the tapered end portion thereof being of a length slightly greater than the combined length of said threaded and tapered portions of said tubular extension and frictionally engaging the same and having its inner end abutting the outer face of said rim nut.

4. In a pneumatic tire valve, an exteriorly threaded valve body, a securing member engaged on said threaded valve body, said securing member being formed to provide an annular flange portion, a rigid tubular extension extending to one side of said flange portion and interiorly threaded for engagement with the threaded valve body, an unbroken elastic end portion formed with said rigid tubular extension and spaced from the wall of said threaded valve body, and a dust cap formed to provide a rigid closed end portion and an open elastic end portion, the inner wall of said open elastic end portion of said dust cap being tapered for frictional engagement with the elastic end portion of said tubular extension of said securing member and of a length to admit of the edge of its open end to contact the outer face of said annular flange portion.

In testimony whereof I affix my signature.

JOHN WILLIAM LAIRD.